(12) United States Patent
Maeda et al.

(10) Patent No.: US 6,666,931 B2
(45) Date of Patent: Dec. 23, 2003

(54) ROLLING PART AND POWER TRANSMISSION PART

(75) Inventors: Kikuo Maeda, Kuwana (JP); Yukio Fujii, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/077,968

(22) Filed: Feb. 20, 2002

(65) Prior Publication Data

US 2002/0157735 A1 Oct. 31, 2002

(30) Foreign Application Priority Data

Feb. 23, 2001 (JP) ....................... 2001-048182
Jun. 12, 2001 (JP) ....................... 2001-176877

(51) Int. Cl.$^7$ .......................... C22C 38/02; C22C 38/04
(52) U.S. Cl. .................. 148/320; 148/906; 384/625; 384/912
(58) Field of Search .............. 148/320, 906; 384/625, 912

(56) References Cited

U.S. PATENT DOCUMENTS 5,725,690 A * 3/1998 Ochi et al. .................. 148/320
6,332,714 B1 * 12/2001 Takemura et al. ............ 384/43

FOREIGN PATENT DOCUMENTS

JP    410219392 A  *  8/1998  ........... C22C/38/00

* cited by examiner

*Primary Examiner*—Deborah Yee
(74) *Attorney, Agent, or Firm*—McDermott, Will & Emery (57) ABSTRACT

There can be obtained a rolling part and power transmission part excluding any expensive elements as its constituents and formed of inexpensive elements C, Si and Mn optimized to allow the same to have a long rolling life under severe conditions for use and be inexpensive and excellent in workability. It is formed of steel shaped and thus processed, and containing 0.5 to 0.7% by weight of C, 0.6 to 1.2% by weight of Si and 0.6 to 1.0% by weight of Mn, as represented in percentage, to satisfy:

$$L \geq 5000 \qquad (1),$$

wherein $L = 11271$ (C wt %)$+5796$ (Si wt %)$+2665$ (Mn wt %)$-6955$; and $$23 \leq H \leq 25 \qquad (2),$$

wherein $H = 48.0$ (C wt %)$+5.7$ (Si wt %)$+11.5$ (Mn wt %)$-16.2$.

7 Claims, 3 Drawing Sheets

ROLLING PART AND POWER TRANSMISSION PART

BACKGROUND OF THE INVENTION

1. Field of the Invention

The present invention relates to rolling parts and power transmission parts formed of carbon steel produced through induction hardening.

2. Description of the Background Art

Conventionally, rolling bearings, a typical rolling part, have often been formed for example of SUJ2 or other similar high-carbon chromium bearing steel, SCM420 or other similar, case-hardened steel carburized, or the like. They are sufficiently reliable steels for bearings. However, they are expensive as they contain Cr, Mo and other expensive elements, and using such elements also results in consumption of rare resources and thus desirably should be avoided. In particular, when SCM420 and other similar case-hardened steels are thermally processed they are required to be heated for a long period of time, or carburized, and this also consumes a large amount of thermal energy.

In contrast, in recent years automobile leg bearings and constant velocity joints (CVJ), ball screws, and any other similar rolling parts also sliding as they roll are formed of S53C or other similar medium carbon steel, with the rolling portion alone induction-hardened. Medium carbon steel has an alloy element content smaller than the afore-mentioned bearing steel and case-hardened steel and it is inexpensive and has satisfactory workability. It is disadvantageous, however, as it is inferior in important characteristics, i.e., it has a shorter rolling life.

To overcome the above disadvantage, conventionally members have been increased in size to alleviate load or surface pressure and they have thus been used without problems. In the future, however, energy conservation and miniaturization will result in high surface pressure acting on such members and a longer rolling fatigue life is thus demanded. Furthermore, CVJs, ball screws and the like can have a rolling portion also sliding as they roll, and they are thus also required to have long life accordingly. Furthermore, miniaturization requires that members be reduced in thickness and that a raw material itself corresponding to a non-hardened portion also have enhanced fatigue strength.

Furthermore as a result of the miniaturization of the part a large amount of heat is emitted and confined and the entirety of the part is thus exposed to higher temperature than conventional.

Thus, energy conservation, miniaturization and the like result in a rolling portion being used under severer conditions and a material providing a long rolling life is thus demanded. As has been described previously, CVJs, ball screws and the like can have a portion sliding as it rolls. As such they are required to have a long life not only as a simply rolling part but a rolling part which also slides. Thus the "rolling life" as aforementioned refers not only to that of a rolling part that simply rolls but that of a rolling part also sliding as it rolls In addition to the above demand, miniaturization and associated reduction of members in thickness entail acceptance of relatively large load. As such, a raw material itself of a non-hardened portion is also required to have larger fatigue strength. In order to in crease the life of the exact raw material without increasing the cost thereof it is effective to increase the contents, as represented in percentage, of C, Si, Mn or any other similar, inexpensive alloy element in conventionally used medium carbon steel. In other words, increasing these inexpensive alloy elements in amount enhances the strength of the raw material and hence the fatigue strength the exact raw material.

If the raw material is excessively hardened, however, it would be inferior in workability. The present invention is directed to a rolling part having a complex shape, for example thread cutting. As such, turnability, forgeability, pierceability and other similar working characteristics are also important. Thus, high-carbon steel and high-alloy steel, such as bearing steel, are unsuitable. Case-hardened steel that is carburized is also unsuitable for the above rolling parts as it needs to have a treaded portion protected against carbonization and its complex shape facilitates over-carburization and if boundary oxidization occurs under mill scale the steel can be impaired in strength. To enhance workability, the raw material can have its hardness adjusted for example by a quenching and tempering process after it is cast and molded. To reduce the cost of the raw material, however, desirably the quenching and tempering process is excluded and the raw material that is not quenched or tempered is processed.

SUMMARY OF THE INVENTION

There can be obtained a rolling part and power transmission part excluding any expensive elements as its constituents and formed of inexpensive elements C, Si and Mn optimized to allow the same to have characteristics equivalent to those of rolling parts using bearing steel, and a power transmission part using the rolling part. The above characteristics are as follows: An application miniaturized and thus incapable of accepting temperature elevation, requires a rolling life allowing for its high temperature use.

(a) Rolling portion corresponding to an induction-hardened portion:
   (a1) rolling life thereof as it simply rolls
   (a2) rolling life thereof as it slides while rolling
(b) Non-hardened portion
   (b1) limit of typical fatigue characteristics, or rotating bending fatigue
   (b2) workability The present invention in one aspect provides a rolling part formed of steel containing 0.5 to 0.8% by weight of C, 0.5 to 1.2% by weight of Si and 0.3 to 1.3% by weight of Mn and having a surface hardness of no less than HRC 59.

The steel contains 0.5 to 0.8% by weight of C to ensure that induction-hardening provides a surface hardness of no less than a predetermined value. It contains C with a lower limit of 0.5% by weight to ensure a long rolling life with a large load imposed while Si, Mn and the like are contained, as predetermined. Carbon forms carbide and to obtain steady hardness larger carbon contents, as represented in percentage, are preferable. Too high carbon contents, as represented in percentage, however, impair cold-workability, and a soaking process for prevention of component segregation, spheroidization of carbide, and other similar, particular heat treatments are required, which is costly. To ensure good cold-workability and dispense with soaking, C has an upper limit set to be 0.8% by weight.

The steel contains 0.5 to 1.2% by weight of Si because Si is an element increasing a rolling life and it also prevents the steel from softening when it is exposed to high temperature, and it acts to delay microstructural change, cracking, and the like attributable to large load applied repetitively. Medium carbon steel containing 0.5 to 1.2% by weight of C, as provided in the present invention, and containing less than 0.5% by weight of Si, cannot exhibit its effect and provides a rolling life increasing as no less than 0.5% by weight of Si increases. More than 1.2% by weight of Si, however, significantly impairs cold-workability and hot-workability and increases production cost. Si thus has an upper limit set to be 1.2% by weight.

0.3% by weight of Mn contained in the steel improves the steel in hardenability and it dissolves into solution in the steel to enhance the steel in toughness and also increases retained austenite beneficial in increasing a rolling life. Mn, however, as well as Si, reinforces a raw material and if its content as represented in percentage is too high it impairs workability and machinability. Mn thus has an upper limit set to be 1.3% by weight.

Desirably Al is low in level to ensure a long rolling life, although it is not necessarily required to be particularly low if it has approximately a normal level, and so is P.

As the above alloy components integrally act, the steel can be produced in the same process line as conventional carbon steel and provide a material providing a long rolling life. Of the above alloy elements, C, Si and Mn contribute to providing inexpensive medium carbon steel having a rolling life close to that of bearing steel and workability close to that of carbon steel. The above-described steel forming the present rolling part that is induction-hardened and tempered, can obtain hardness of no less than HRC 59. The steel for example induction-hardened ensures hardness more reliably than S53C or other similar, typical carbon steel induction-hardened, as the former contains the alloy elements C, Mn and Si increased in amount and thus has high hardenability.

In the above first aspect desirably the rolling part is formed for example of the steel containing C, Si and Mn, as represented in percentage, satisfying the following expressions (1) and (2):

$$L = 11271 \text{ (C } wt \text{ \%)} + 5796 \text{ (Si } wt \text{ \%)} + 2665 \text{ (Mn } wt \text{ \%)} - 6955 \quad (1)$$

$$L \geq 5000 \quad (2)$$

wherein L represents an estimated index of a rolling life obtained through multiple regression analysis. In the present invention, C, Si and Mn are limited by the condition L25000 as provided above. Thus, with hardenability and the like enhanced, hardness ensured, and the like, a further increased rolling life can be provided.

In the above first aspect desirably the rolling part is formed of the steel containing for example no more than 0.02% by weight of Al and no more than 0.02% by weight of P.

Al forms an oxide-based, non-metallic inclusion and it thus has a negative effect on a rolling life. In particular, C, Si, Mn-based steel, as used for the present rolling part, is more disadvantageously susceptible to non-metallic inclusion. No more than 0.02% by weight of Al is thus desirable.

P segregates at grain boundary and reduces toughness. As such, with austenite phase being low in state, no more than 0.02% by weight of P is desirably used to provide a long rolling life and enhanced fatigue strength.

The present rolling part is produced in a method including the steps of: processing in a predetermined shape a steel at least containing 0.5 to 0.8% by weight of C, 0.5 to 1.2% by weight of Si and 0.3 to 1.3% by weight of Mn; and induction-hardening a member processed in the step of processing. Introducing C, Si, Mn in an appropriate range more in amount than S53C or other similar, typical medium carbon steel, can maintain excellent workability and in addition ensure high hardenability. As such, the present steel can be readily processed on the same process line as conventional carbon steel and it also readily ensures a high level of hardness through induction-hardening. Furthermore, increasing Si in amount mainly can provide a high level of strength for high temperature. Thus a high yield of rolling parts can be produced efficiently.

Desirably in the present method for example the step of induction-hardening is followed by the step of tempering the member to provide a surface hardness of no less than HRC59. The steel used to form the present rolling part has a composition with Si increased in amount and thus highly resistant to softening attributable to tempering. Thus it readily ensures hardness if it is quenched and tempered at (a) relatively high temperature or (b) the same temperature for a long period of time.

The present invention in a second aspect provides a rolling part formed of steel shaped and thus processed, at least containing as alloy elements 0.5 to 0.7% by weight of C, 0.6 to 1.2% by weight of Si and 0.6 to 1.0% by weight of Mn, as represented in percentage, to satisfy the following equations (1) and (2):

$$L \geq 5000 \quad (1)$$

wherein L represents an estimated lifetime in regression calculated from a measured value of life as the rolling part simply rolls and $$L = 11271 \text{ (C } wt \text{ \%)} + 5796 \text{ (Si } wt \text{ \%)} + 2665 \text{ (Mn } wt \text{ \%)} - 6955; \text{ and } 23 \leq H \leq 25 \quad (2)$$

wherein H is an estimated value of the following equation:

$$H = 48.0 \text{ (C } wt \text{ \%)} + 5.7 \text{ (Si } wt \text{ \%)} + 11.5 \text{ (Mn } wt \text{ \%)} - 16.2$$

in hardness of a raw material, as calculated from a measured value of the hardness of the raw material.

In the above configuration the chemical composition has a range set for the following reason: no less than 0.5% by weight of C is required for allowing induction-hardening to ensure hardness of no less than a predetermined value and for ensuring a satisfactory rolling life with a large load imposed while Si and Mn are contained invariable in amount. Thus C has a lower limit set at 0.5% by weight. C forms carbide and to constantly ensure hardness larger amounts of C are preferred, although more than 0.7% by weight of C would result in raw material having too high levels of hardness and impair workability. Furthermore, a soaking process for prevention of component segregation, a carbide spheroidization process, and other similar, particular thermal treatments would also be required, which is costly. No more than 0.7% by weight of C is thus set.

0.6% by weight of Si contained in the steel reinforces raw material to provide a long rolling life and also prevents it from significantly softening when it is exposed to high temperature. Furthermore the Si thus contained acts to delay microstructural change, cracking, and the like attributable to large loads applied repetitively. It also does not contribute to increasing the raw material in hardness so much as Mn described hereinafter. More than 1.2% by weight of Si impairs cold-workability and hot-workability. No more than 1.2% by weight Si is thus set.

0.6% by weight of Mn contained in the steel improves hardenability and it dissolves into solution in the steel to enhance the steel in toughness and also increases retained austenite beneficial in increasing a rolling fatigue life. Mn, however, as well as Si, reinforces a raw material and it also dissolves into carbide and thus increases hardness thereof and hence that of the raw material. Thus more than 1.0% by weight of Mn impairs workability and machinability. Mn thus has a range set to be 0.6 to 1.0% by weight.

The above estimated value of life set to be 5,000 is required in order to provide an induction-hardened portion with a rolling fatigue life L10 of no less than 5,000 multiplied by $10^4$.

Furthermore if the raw material has an estimated value H in hardness of no less than 23 a non-hardened portion that is not quenched or tempered can have a rolling and bending fatigue strength of no less than 400 MPa. For H exceeding 25, however, it would be hardened excessively and thus impaired in workability. H of no more than 25 is thus set. These levels of hardness may be that of a material of a portion hardly varying with a low-temperature tempering process and free from an effect of induction-hardening that has been tempered in a low temperature range.

In the above, second aspect the rolling part can include a hardened portion provided by the steel shaped and thus processed that is induction-hardened.

Employing induction-hardening to provide a hardened portion can provide a rolling part with a rolling portion having a long rolling fatigue life and a long rolling and sliding fatigue life.

In the above, second aspect desirably the material of the portion free from the effect of induction-hardening has a $10^7$-time fatigue limit of no less than 400 MPa, as measured in a rotating bending fatigue.

Thus the steel can obtain a level of fatigue strength more than 30% higher on average than conventional medium carbon steel and thus endure severe conditions in use expected in the future, such as large load, large torque, and miniaturization. Note that the portion free from the effect of induction-hardening for example includes (a) raw material (before it is neither shaped nor induction-hardened), (b) a portion induction-hardened and tempered and yet free from the effect of induction-hardening, and (c) a portion induction-hardened and not yet tempered, and free from the effect of induction-hardening.

In the above, second aspect desirably the rolling part at a rolling portion corresponding to an induction-hardened portion can have a rolling life L10 of no less than 5,000 multiplied by $10^4$ times, as measured in a rolling fatigue test, and a life longer than S53C, as measured in a rolling and sliding fatigue test.

As such if rolling and associative sliding stress is applied the rolling part can have sufficient durability.

A power transmission part including any one of the above rolling parts can have a satisfactory level of workability, a long rolling life and a long rolling and sliding life, and it also can have a non-hardened portion having superior fatigue characteristics. Thus it can have high durability and also be inexpensive.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention in embodiments will now be described.

EXAMPLES

First Example

The present invention in a first example provides a rolling part in a first aspect. It is formed of steel having a composition having a range determined by C, Si and Mn alone. More specifically the present invention in the first example provides steel containing 0.5 to 0.8% by weight of C, 0.5 to 1.2% by weight of Si and 0.3 to 1.3% by weight of Mn, as shown in Table 1.

TABLE 1

| class | No. | chemical composition (% by mass) | | | | note |
|---|---|---|---|---|---|---|
| | | C | Si | Mn | Cr | |
| examples of the present invention | 1 | 0.53 | 1.00 | 0.31 | — | — |
| | 2 | 0.64 | 0.83 | 0.60 | — | — |
| | 3 | 0.55 | 0.81 | 0.60 | — | — |
| | 4 | 0.76 | 0.55 | 1.15 | — | — |
| | 5 | 0.56 | 0.82 | 0.83 | — | — |
| | 6 | 0.60 | 0.80 | 0.60 | — | — |
| | 7 | 0.55 | 1.00 | 0.30 | — | — |
| | 8 | 0.58 | 1.00 | 0.80 | — | — |
| | 9 | 0.58 | 0.50 | 1.20 | — | — |
| | 10 | 0.61 | 0.88 | 0.72 | — | — |
| comparative examples | 1* | 0.53 | 0.20* | 0.85 | — | S53C |
| | 2* | 0.63 | 0.10* | 0.58 | — | — |
| | 3 | 0.53 | 0.61 | 0.50 | — | — |
| | 4* | 0.55 | 0.11* | 0.60 | — | — |
| | 5 | 0.53 | 0.60 | 0.60 | — | — |
| | 6* | 0.53 | 0.38* | 0.25* | — | — |
| | 7* | 0.53 | 0.20* | 0.25* | — | — |
| | 8* | 0.55 | 0.20 | 0.75 | — | — |
| | 9* | 0.45* | 0.80 | 0.80 | — | — |
| | 10* | 1.00* | 0.25 | 0.35 | 1.50 | SUJ2 |

The mark * indicates that an example therewith does not fall within the range of the first example of the present invention.

As comparative example steels were prepared, as provided in Table 1. Note that although comparative examples Nos. 3 and 5 are steels containing C, Si and Mn ranged as above and thus should be included in the list of the examples of the present invention, they are included in the list of the comparative examples for the sake of the description of a second example of the present invention. The list of the comparative examples also includes S53C (No. 1), a standard steel for induction-hardening, and bearing steel SUJ2 (No. 10). Theses steels contained no more than 0.02% by weight of Al and no more than 0.02% by weight of P. All of the steels were machined and thus each shaped into a piece for a rolling life test. Then, all of the pieces of the examples of the present invention and the comparative examples of Table 1 except for comparative example No. 10, were induction-hardened to a depth of approximately 2 mm to prepare pieces for the rolling life test. Comparative example No. 10, a bearing steel, was hardened by through hardening. Additional test pieces of the examples of the present invention and those of the comparative examples were also prepared for measurement of surface hardness and it has been confirmed that Nos. 1–10 of the present invention and comparative examples Nos. 3 and 5 had a surface hardness of no less than HRC 59.

The above steels were used to prepare test piece samples and a $\phi 12$ cylinder rolling life test hereinafter referred to as a "rolling fatigue test") was conducted on the samples. In this test a high surface pressure and a high load rate are applied to acceleratively fatigue a sample and thus estimate it. For each numbered test 15 samples were prepared and estimated in fatigue strength by L10 life, i.e., a load application frequency allowing 90% of the samples can be used without spalling. The test was conducted under the following conditions:

size of sample piece: 12 mm in diameter and 22 mm in length
    size of counterpart steel ball: 19.05 mm in diameter
    contact stress P max: 5.88 GPa
    load rate: 46,240 times/min.

The test results are shown in Table 2:

TABLE 2

| class | No. | rolling fatigue test (by $10^4$) | | peeling test | |
|---|---|---|---|---|---|
| | | estimation | measurement | percentage of occurrence (%) | ratio |
| examples of the present invention | 1 | 5640 | 5990 | 6.1 | 0.56 |
| | 2 | 6668 | 6850 | 6.1 | 0.56 |
| | 3 | 5537 | 5450 | 7.3 | 0.68 |
| | 4 | 7863 | 7200 | 5.5 | 0.51 |
| | 5 | 6321 | 6590 | 6.2 | 0.57 |
| | 6 | 6043 | 6120 | 6.8 | 0.63 |
| | 7 | 5840 | 5530 | 6.2 | 0.57 |
| | 8 | 7510 | 7210 | 5.5 | 0.51 |
| | 9 | 5678 | 5810 | 7.5 | 0.69 |
| | 10 | 6939 | 7410 | 7.0 | 0.65 |
| comparative examples | 1** | 2443** | 2630 | 10.8 | 1.00 |
| | 2** | 2271** | 2005 | 12.8 | 1.19 |
| | 3** | 3890** | 3720 | 9.9 | 0.91 |
| | 4** | 3079** | 3300 | 12.1 | 1.12 |
| | 5** | 4095** | 4450 | 8.4 | 0.78 |
| | 6** | 1887** | 1920 | 11.9 | 1.10 |
| | 7** | 844** | 900 | 16.5 | 1.52 |
| | 8** | 2268** | 2100 | 17.2 | 1.59 |
| | 9** | 4885** | 4610 | 14.9 | 1.38 |
| | 10** | 6810** | 7300 | 7.8 | 0.72 |

1) Estimated life is calculated by substituting the amounts of C, Si and Mn into expression 1.
2) Mark ** indicates that a value/number therewith does not fall within the range of the second example of the present invention.
3) Comparative example 10, or SUJ2, was hardened by through hardening.

Nos. 1–10 of the present invention and Nos. 3 and 5 thereof in the comparative example list all exhibit long L10 life. In particular, Nos. 4, 8 and 10, with high, appropriate C, Si and Mn contents in percentage, exhibited life almost comparable to that of bearing steel SUJ2 (comparative example No. 10).

In contrast, comparative example No. 1 (S53C) provided an L10 life of approximately 2,600 multiplied by $10^4$, No. 2, with C alone increased, provided approximately 2,000 by $10^4$, and No. 4, with Mn alone increased, provided 3,300 by $10^4$, and increasing a single element in amount is less effective. This also applies to Nos. 3 and 5 of the present invention in the comparative example list, since although C, Si and Mn fall in the range of the present invention, Si alone is increased in amount, resulting in insignificantly increased L10 lives of 3,720 by $10^4$ and 4,450 by $10^4$, respectively. It is also important to ensure a satisfactory C content in percentage, and comparative example No. 9, with high Si and Mn and low C, provided a relatively small value of 4,600 by $10^4$.

Figure 1:
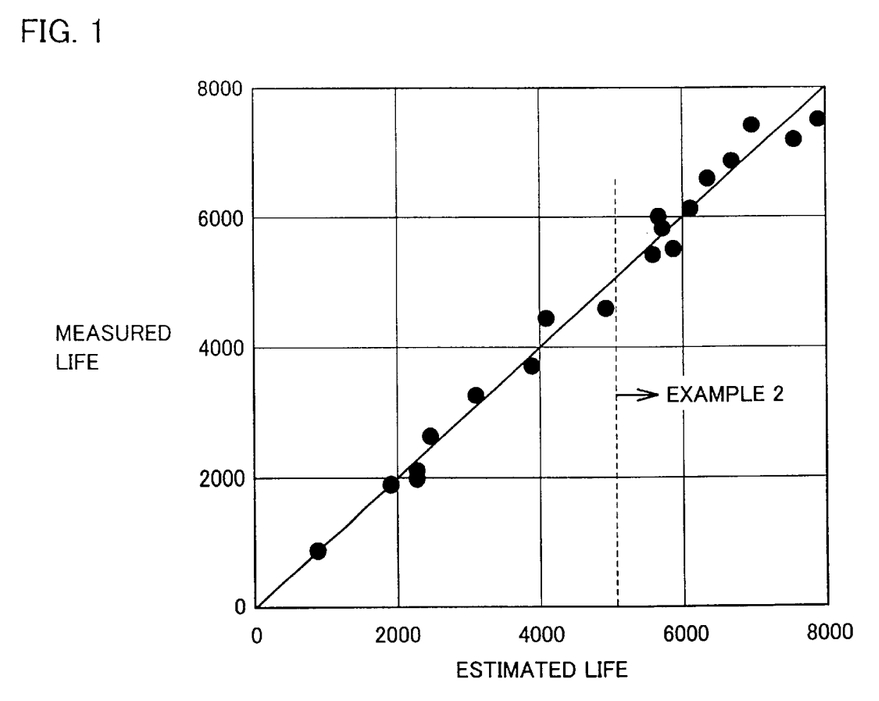
FIG. 1 represents a correlation between chemical composition and rolling life of steel used in an example of the present invention and a comparative example, as provided in first and second embodiments of the present invention.

FIG. 1 represents for the steels studied in the first example a relationship between C, Si and Mn contents in percentage and L10 life through multiple regression analysis. It can been seen from FIG. 1 that regression expression L of expression (1) and L10 life have an excellent correlation therebetween. Note that in FIG. 1, a repetition figure of $10^4$ is represented as one.

In Table 2 a column "estimation" presents values L10 provided by the above item (1) and a column "measured result" presents test results as measured. It has been found from the test results as measured that the steels of the first example of the present invention all provide L10 longer than standard, comparative example No. 1.

Second Example

The present invention in a second example provides a rolling part of the first aspect. It is formed of steel having a composition satisfying the range of C, Si and Mn and the requirements of expressions (1) and (2). More specifically, not only the range of C, Si and Mn but also $L \geq 5000$ need to be satisfied. In the present example the rolling part and comparative examples were formed of steel, as presented in Table 1. The present example uses example Nos. 1–10 of the present invention, as listed, and comparative example steel Nos. 1–10, as listed. Each steel has a value L matching a value in the column "estimation" of a rolling fatigue test as shown in Table 2. According thereto, example steel Nos. 1–10 of the present invention all have a value L of no less than 5,000 and in contrast, comparative example steel Nos. 1–9 have a value L less than 5,000 and comparative example steel No. 10 alone has a value L no less than 5,000, although it has a C content in percentage failing to fall within the range of the present invention.

The above steels were subjected to a peeling test. In the test, a test piece in the form of a ring with a cylindrical portion having a small curvature, is attached to each of a driving shaft and a driven shaft provided parallel to the driving shaft and the test pieces have their cylindrical surfaces pressed against each other and thus rolled to see how they are damaged. The test piece were dimensioned to have a diameter of 40 mm, a width of 12 mm, and a cylindrical portion having the other principal radius of curvature of 60 mm. The test piece on the driving shaft had a cylindrical surface ground to have an R max of 3 $\mu$m in roughness and that on the driven shaft had a cylindrical surface super finished. Peeling strength is estimated by the percentage of the area of the cylindrical surface of the test piece on the driven shaft that has peeled, as observed when the test completes. The test piece on the driving shaft and that on the driven shaft were samples of a single steel, used in pair. The test was conducted under the conditions:

test piece's maximum surface roughness: 3.0 $\mu$m on the driving shaft's side and 0.2 $\mu$m on the driven shaft's side
    (maximum) contact stress P max: 2.3 GPa
    lubricant oil: turbine oil VG46 driving shaft's rotation rate: 2,000 rpm total rotation rate: 4.8 by $10^5$ times.

The peeling test provided a result, as also shown in Table 2. According to the result, example test pieces Nos. 1–10 peeled in an area smaller in percentage than comparative examples and exhibited satisfactory, anti-peelability equivalent to or better than comparative example No. 10 or SUJ2.

From the results of the first and second examples it can be seen that the present invention in the second example provides a rolling part having a long rolling life and superior anti-peelability and hence capable of sufficiently allowing for severer contact stress conditions, conditions facilitating peeling, and other similar conditions.

Third Example

Figure 2:
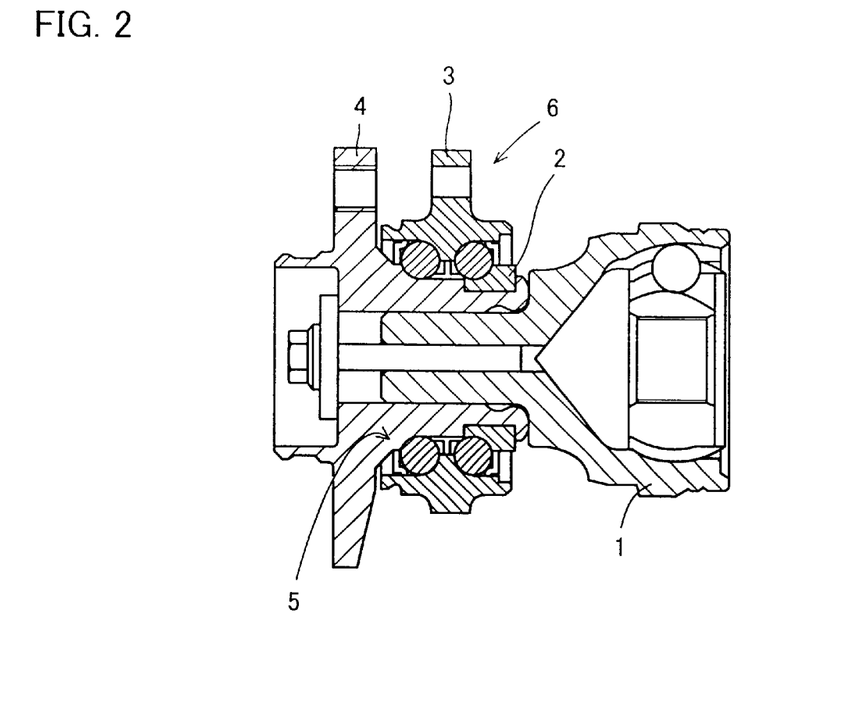
FIG. 2 schematically shows a third generation H/U having a wheel bearing and a CVJ combined together, with a rolling part of the present invention in a second aspect applied.
Figure 3:
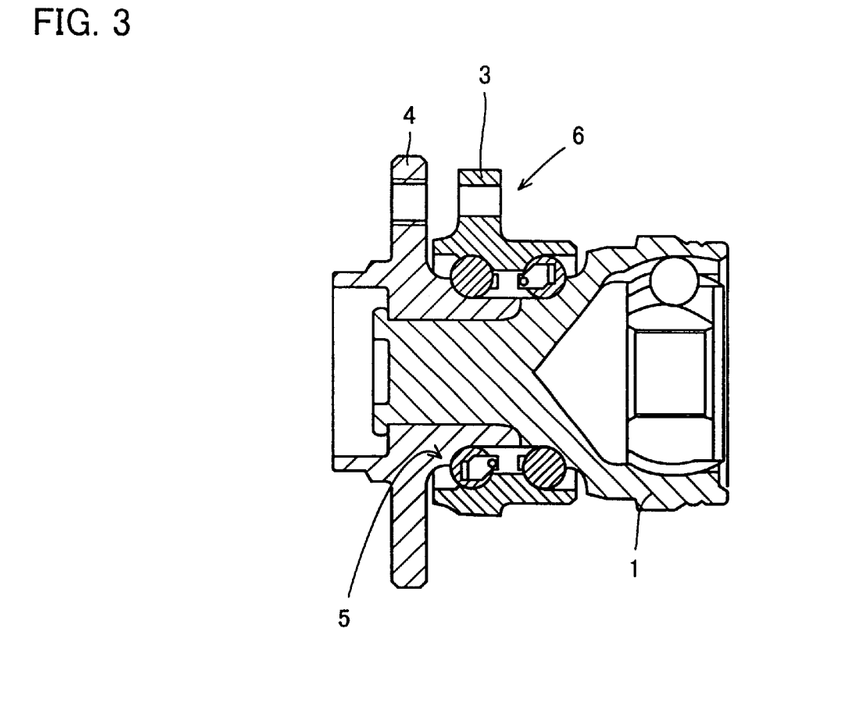
FIG. 3 schematically shows a fourth generation H/U having a wheel bearing and a CVJ combined together, with the rolling part of the present invention in the second aspect applied.

FIGS. 2 and 3 each show a hub unit using a rolling part of the present invention in a second aspect. FIG. 2 schematically shows a third generation hub unit (H/U), a hub joint having a wheel bearing and a CVJ combined together. FIG. 3 schematically shows a further developed, fourth generation H/U. The FIG. 2 third generation H/U has one inner ring lace 2 integrated with a hub wheel 4 and the other inner ring lace 5 is crimped with hub wheel 4. An outer ring 3 is structured to be directly fixed to a knuckle. In the third generation H/U a CVJ 1 is an independent part. In the fourth generation H/U, in contrast, it is structured to be more compact, and one inner ring lace 5 is integrated with hub wheel 4, which is the same as the third generation, although the other inner ring lace is integrated with an outer joint ring 3. As such the portion is required to have both of (a) a rolling fatigue life as a bearing lace portion and (b) a life as a joint for a rolling, reciprocating movement as it slides.

The third example is an example of the rolling part of the present invention in the second aspect. As shown in Table 3, the rolling part in the second aspect was formed of steels having chemical compositions A1 to A5. As comparative examples were prepared steels having chemical compositions B1 to B18 which do not fall within the range of the present invention in the second aspect. The comparative example steels, even if with C, Si and Mn in the range of the steel as provided in the second aspect, is associated with index L or H outside the range as provided in the present invention.

These steels were used as raw material to prepare (a) a piece induction-hardened to a depth of approximate 2 mm for a rolling fatigue test, (b) a piece for a rolling and sliding fatigue test, and (c) a test piece for an experiment simulating a hardness of a raw material that is not quenched or tempered. Note that as indicated in the column "note" comparative example B1 is a conventional medium carbon steel S53C and comparative example B18 is a bearing steel SUJ2.

TABLE 3

| class | No. | chemical composition (wt %) | | | | note |
| --- | --- | --- | --- | --- | --- | --- |
| | | C | Si | Mn | Cr | |
| examples of the present invention | A1 | 0.56 | 0.82 | 0.83 | — | |
| | A2 | 0.60 | 0.80 | 0.60 | — | |
| | A3 | 0.53 | 0.62 | 0.98 | — | |
| | A4 | 0.63 | 0.62 | 0.60 | — | |
| | A5 | 0.52 | 1.16 | 0.74 | — | |
| comparative examples | B1 | 0.53 | 0.20* | 0.85 | — | (S53C)L*, H* |
| | B2 | 0.53 | 1.00 | 0.31* | — | H* |
| | B3 | 0.64 | 0.83 | 0.60 | — | H* |

TABLE 3-continued

| class | No. | chemical composition (wt %) | | | | note |
| --- | --- | --- | --- | --- | --- | --- |
| | | C | Si | Mn | Cr | |
| | B4 | 0.55 | 0.81 | 0.60 | — | H* |
| | B5 | 0.76* | 0.55* | 1.15* | — | H* |
| | B6 | 0.55 | 1.00 | 0.30* | — | H* |
| | B7 | 0.58 | 1.00 | 0.80 | — | H* |
| | B8 | 0.58 | 0.50* | 1.20* | — | H* |
| | B9 | 0.61 | 0.88 | 0.72 | — | H* |
| | B10 | 0.63 | 0.10* | 0.58* | — | L*, H* |
| | B11 | 0.53 | 0.61 | 0.50* | — | L*, H* |
| | B12 | 0.55 | 0.11* | 0.60 | — | L*, H* |
| | B13 | 0.53 | 0.60 | 0.60 | — | L*, H* |
| | B14 | 0.53 | 0.38* | 0.25* | — | L*, H* |
| | B15 | 0.53 | 0.20* | 0.25* | — | L*, H* |
| | B16 | 0.55 | 0.20* | 0.75 | — | L*, H* |
| | B17 | 0.45* | 0.80 | 0.80 | — | L*, H* |
| | B18 | 1.00* | 0.25* | 0.35* | 1.5 | (SUJ2) |

The mark * indicates that a value/index therewith does not fall within the range of the present invention.

I. Conditions for Tests (1) Rolling Fatigue Test

The present example steels A1 to A5 induction-hardened and then tempered all achieved hardness of no less than HRC59. Thus it can be said that they can provide a level of hardness constantly higher than the conventional medium carbon steel S53C. As has been described above, conventional medium carbon steel has a disadvantage that it has a rolling life shorter than bearing steel. It is expected to be used in the future under severe conditions and desirably it should have a rolling life comparable to that of bearing steel. This rolling fatigue test was conducted to estimate a rolling life of steel as it simply rolls. The test was conducted under the following conditions. In the test a number n of 15 was set and a rolling life was estimated by L10 life.

dimension of test piece: 12 mm in outer diameter and 22 mm in length dimension of counterpart steel ball: 19.05 mm in diameter maximum contact stress Pmax: 5.88 GPa load Rate: 46,240 times/min.

(2) Rolling and Sliding Fatigue Test

As well as in the rolling fatigue test, all were induction-hardened and then tempered, and provided hardness of no less than HRC 59. As has been described previously, it has been confirmed that they can provide a level of hardness constantly higher than the conventional medium carbon steel S53C. CVJs and ball screws can have their rolling portions sliding as they roll. They are thus required not only to have a long life as they simply roll but also a long life as they slide while rolling. The rolling and sliding fatigue test was a 2-cylinder test conducted to estimate a rolling life of steel as it rolls and associatively also slides. The test was conducted under the following conditions:

piece to be tested: 40 mm in outer diameter by 12 mm in width, with an outer diameter having the other principal curvature (straight)

counterpart test piece: 40 mm in outer diameter by 12 mm in width, with an outer diameter having the other principal curvature of 60 mm, and formed of bearing steel SUJ2 maximum contact stress Pmax: 3.5 GPa rotation rate: 1,800 rpm for piece to be tested and 2,000 rpm for counterpart test piece lubricant: turbine oil VG46

(3) Test Simulating Hardness of Raw material Non-quenched and Non-tempered

From raw material a cylinder of 30 mm in diameter by 30 mm in length was cut out and used as a test piece. Note that a "non-quenched and non-tempered" material refers to that cast and then air-cooled. If the non-quenched and non-tempered material has too high a level of hardness and in a subsequent step it is ground, bored or similarly processed with a tool in complex manners the tool could be reduced in life or the material can crack when it is worked to be bent. On the contrary, if it is too soft it cannot obtain sufficient fatigue strength and it would hardly be used under severe conditions expected in the future. More specifically, no more than HRC 25 is desirable in terms of workability.

Furthermore, increased load, increased torque and miniaturization are expected in the future and a non-hardened portion thus would receive large load. Thus desirably it has a fatigue strength greater than conventional medium carbon steel by no less than 30% on average, which is no less than 400 MPa as currently used medium carbon steel has a rotating bending fatigue limit (a $10^7$-time fatigue strength) of approximately 300 MPa on average. It is conventionally known that a rotating bending fatigue limit σwb and hardness (HV) have a relationship therebetween of σwb equal 1.54 HV. When σwb of 400 MPa is substituted in this expression, a required hardness of HRC 23 was calculated. Thus, in terms of fatigue strength, hardness of no less than HRC 23 is desirable. Accordingly, to simulate hardness of raw material non-quenched and non-tempered, a test was conducted. In the test, a test piece was held at 1,200° C. for one hour and then immediately exposed to the atmosphere and thus naturally air-cooled and the test piece then had its hardness measured at a portion in a vicinity of its center.

II. Test Result

Table 4 presents a result of each of (1) the rolling fatigue test, (2) the rolling, sliding fatigue test, and (3) the test simulating a hardness of a raw material non-quenched and non-tempered.

TABLE 4

| class | No. | rolling life $L^{10}$ (by $10^4$) measured value | rolling life $L^{10}$ (by $10^4$) estimated value | ratio in rolling & sliding life (to S53C) | Hardness of raw material (HRC) measured value | Hardness of raw material (HRC) estimated value | Note |
|---|---|---|---|---|---|---|---|
| examples of the present invention | A1 | 6590 | 6321 | 1.9 | 25.1 | 24.9 | |
| | A2 | 6120 | 6043 | 1.5 | 24.7 | 24.1 | |
| | A3 | 5361 | 5224 | 1.7 | 24.6 | 24.0 | |
| | A4 | 5588 | 5338 | 1.4 | 24.9 | 24.5 | |
| | A5 | 7789 | 7601 | 1.8 | 23.8 | 23.9 | |
| comparative examples | B1 | 2630 | 2443* | 1.0 | 20.2 | 20.2* | S53C |
| | B2 | 5990 | 5641 | 0.6 | 19.4 | 18.5* | |
| | B3 | 6850 | 6668 | 1.2 | 28.0 | 26.2* | |
| | B4 | 5450 | 5538 | 1.6 | 22.2 | 21.7* | |
| | B5 | 7200 | 7864 | 1.0 | 35.5 | 36.6* | |
| | B6 | 5530 | 5840 | 0.6 | 21.0 | 19.4* | |
| | B7 | 7210 | 7510 | 1.5 | 27.0 | 26.5* | |
| | B8 | 5810 | 5678 | 1.6 | 27.3 | 28.3* | |
| | B9 | 7410 | 6940 | 1.4 | 25.6 | 26.4* | |
| | B10 | 2005 | 2271* | 0.7 | 21.7 | 21.3* | |
| | B11 | 3720 | 3887* | 1.3 | 19.6 | 18.5* | |
| | B12 | 3300 | 3079* | 0.9 | 17.1 | 17.7* | |
| | B13 | 4450 | 4095* | 1.6 | 19.6 | 19.6* | |
| | B14 | 1920 | 1887* | 0.3 | 13.6 | 14.3* | |
| | B15 | 900 | 844* | 0.5 | 12.9 | 13.3* | |
| | B16 | 2100 | 2402* | 0.9 | 19.3 | 20.0* | |
| | B17 | 4610 | 4886* | 0.5 | 18.3 | 19.2* | |
| | B18 | 7300 | 6698 | 1.4 | 35.7 | 37.3* | SUJ2 |

The mark * indicates that a value therewith does not fall within the range of the present invention.

The standard S53C (comparative example B1) measured approximately 2,600 by $10^4$ and bearing steel SUJ2 (comparative example B18) measured approximately 7,300 by $10^4$ in L10 (a 10% longevity) as they simply roll, and S53C was no more than half in L10 of SUJ2. The steel of the present invention, configured of inexpensive chemical components alone, could not be comparable to bearing steel SUJ2, although desirably it has an L10 of no less than 5,000 by $10^4$, a value approximately at least twice that of S53C. It can be seen that example A1–A5 of the present invention are all have an L10 having a satisfactory value no less than 5,000 by $10^4$.

In addition, they have an average life no less than 1.5 times greater than S53C and superior to SUJ2 as they slide while rolling. Furthermore, the example steels of the present invention all have their respective raw materials simulating to be non-quenched and tempered having hardness within a range of 23≦HRC≦25, as measured. In contrast, comparative example steels B2–B9 exhibit L10s of no less than 5,000 by $10^4$ and comparative examples B4, B7 and B8 in particular also have their rolling and sliding lives no less than 1.5 times greater than S53C. These comparative example steels, however, all have their raw materials each having a harness failing to fall within 23<HRC≦25, as measured. Note that in spite of their rolling lives rather longer than S53C, comparative examples B2 and B6 each have a rolling and sliding life shorter than S53C. A chemical composition with more Si and less Mn tends to provide a shorter rolling and sliding life.

Lifetime, as measured, and hardness of raw material, as measured, as the steel simply rolls, went through multiple regression analysis to obtain a correlation thereof with chemical components C, Si and Mn. The multiple regression analysis provided a multiple regression expression, as represented in expressions (1) and (2) for estimation. With reference to Table 4, an estimated lifetime L and an estimated hardness H of raw material as the steel simply rolls, are values obtained by substituting the steel's chemical composition into expressions (A) and (13):

$$L = 11271 \text{ (C wt \%)} + 5796 \text{ (Si wt \%)} + 2665 \text{ (Mn wt \%)} - 6955 \quad \text{(A)}$$

$$H = 48.0 \text{ (C wt \%)} + 5.7 \text{ (Si wt \%)} + 11.5 \text{ (Mn wt \%)} - 16.2 \quad \text{(B)},$$

wherein "%" represents "% by weight."

Figure 4:
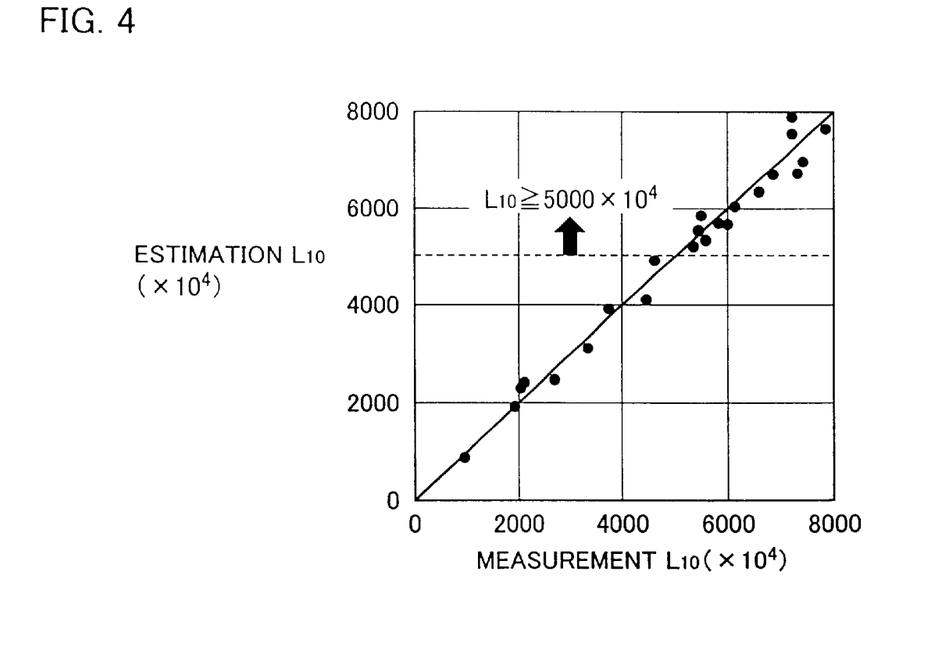
FIG. 4 represents a relationship between measured and estimated values of a rolling fatigue life L10 of the present invention in a third embodiment as it simply rolls.
Figure 5:
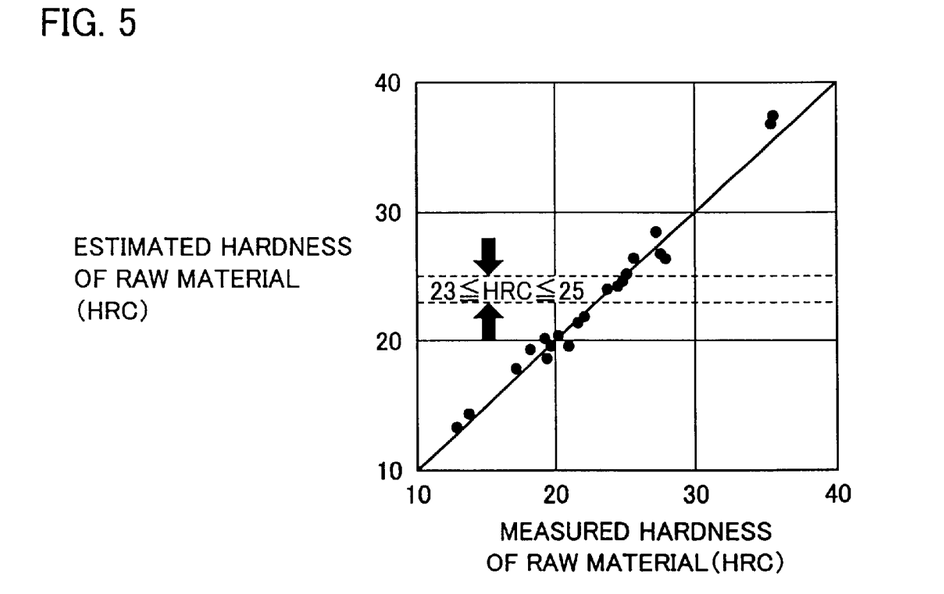
FIG. 5 represents a relationship between measured and estimated values in hardness of a raw material non-quenched and non-tempered in the third embodiment.

FIG. 4 represents fatigue life of steel as it simply rolls and FIG. 5 represents hardness of raw material, as represented in an expression for estimation and measured. It can be seen from the figures that the measured and estimated values have an excellent correlation therebetween. More specifically, it means that if the amounts of chemical components C, Si and Mn contained are found, as represented in percentage, fatigue life as the steel simply rolls and hardness of raw material can both be estimated with high precision.

In the present example, in addition to the steel's individual chemical components, estimated values L and H obtained from expressions (A) and (B) need to satisfy the following conditions:

$$L \geq 5{,}000 \quad (1)$$

$$23 \leq H \leq 25 \quad (2).$$

Together with the range of each of chemical components C, Si and Mn, estimated values L and H determined these chemical components that satisfy expressions (1) and (2) allow the present rolling part to have all required characteristic.

Although the present invention has been described and illustrated in detail, it is clearly understood that the same is by way of illustration and example only and is not to be taken by way of limitation. For example the present invention has a scope including:

(a) a rolling part which may be a shaped and thus processed product that is not induction-hardened, as most generally defined; and (b) a shaped and thus processed product induction-hardened and thereafter entirely tempered.

The spirit and scope of the present invention is limited only by the terms of the appended claims and further includes any variation equivalent in meaning and range to the claims as recited.

What is claimed is:

1. A rolling part formed of steel shaped and thus processed, at least containing as alloy elements 0.5 to 0.7% by weight of C, 0.6 to 1.2% by weight of Si and 0.6 to 1.0% by weight of Mn, as represented in percentage, to satisfy:

$$L \geq 5000 \quad (1),$$

wherein L=11271 (C wt %)+5796 (Si wt %)+2665 (Mn wt %)−6955; and $$23 \leq H \leq 25 \quad (2),$$

wherein H=48.0 (C wt %)+5.7 (Si wt %)+11.5 (Mn wt %)−16.2, and said steel contains no more than 0.02% by weight of Al and no more than 0.02% by weight of P.

2. The rolling part of claim 1, wherein said steel shaped to be a product has a hardened portion provided through induction-hardening.

3. The rolling part of claim 2, having a portion free from an effect of said induction-hardening, formed of a material providing a $10^7$-time fatigue limit of no less than 400 MPa, as measured in a rolling and bending fatigue test.

4. The rolling part of claim 2, wherein said hardened portion obtained through induction-hardening provides a rolling portion having a rolling life L10 of no less than 5,000 multiplied by $10^4$ times, as measured in a rolling fatigue test, and a life longer than S53C, as measured in a rolling, sliding fatigue test while said hardened portion rolls and also slides.

5. The rolling part of claim 3, wherein said hardened portion obtained through induction-hardening provides a rolling portion having a rolling life L10 of no less than 5,000 multiplied by $10^4$ times, as measured in a rolling fatigue test, and a life longer than S53C, as measured in a rolling, sliding fatigue test while said hardened portion rolls and also slides.

6. A power transmission part comprising the rolling part as recited in claim 2.

7. A power transmission part comprising the rolling part as recited in claim 5.

\* \* \* \* \*